(12) United States Patent
Zhang

(10) Patent No.: US 9,389,934 B1
(45) Date of Patent: Jul. 12, 2016

(54) CENTRALIZED AND DISTRIBUTED NOTIFICATION HANDLING SYSTEM FOR SOFTWARE APPLICATIONS

(71) Applicant: Jenny (Wenli) Zhang, San Jose, CA (US)

(72) Inventor: Jenny (Wenli) Zhang, San Jose, CA (US)

(73) Assignee: SAP SE, Walldorf (DE)

( * ) Notice: Subject to any disclaimer, the term of this patent is extended or adjusted under 35 U.S.C. 154(b) by 26 days.

(21) Appl. No.: 14/575,009

(22) Filed: Dec. 18, 2014

(51) Int. Cl.
*G06F 9/54* (2006.01)
*G06F 9/46* (2006.01)
*G06F 9/44* (2006.01)

(52) U.S. Cl.
CPC ........ *G06F 9/546* (2013.01); *G06F 8/24* (2013.01); *G06F 9/466* (2013.01); *G06F 9/542* (2013.01)

(58) Field of Classification Search
CPC ........................................................ G06F 9/542
See application file for complete search history.

(56) References Cited

U.S. PATENT DOCUMENTS 6,775,658 B1 * 8/2004 Zothner ............ G06Q 10/087
  705/28

OTHER PUBLICATIONS

Rambo, F., "How to Customize Notification Templates for AC 10.0 Workflow" (Mar. 31, 2011), pp. 1-22 [retrieved from http://scn.sap.com/docs/DOC-1565].*

Subramaniam, S., "Downtime Manager Introduction and Operations" (2008), pp. 1-23 [retrieved from http://www.sdn.sap.com/irj/scn/go/portal/prtroot/docs/library/uuid/a00fb19b-7b6b-2b10-e5b0-bec0eaa49532?QuickLink=index&overridelayout=true&33006823670571].*

* cited by examiner

*Primary Examiner* — Brian W Wathen
(74) *Attorney, Agent, or Firm* — Fish & Richardson P.C.

(57) ABSTRACT

The present disclosure describes methods, systems, and computer program products for handling notifications. One computer-implemented method includes selecting an object type for a notification object; customizing a common attribute of the notification object, wherein the common attribute is defined in a common notification object; determining whether the notification object includes additional attributes to be customized; in response to a determination that the notification object includes additional attributes to be customized, customizing a type attribute of the notification object, wherein the type attribute is defined in a type notification object that has the selected object type; and storing the notification object.

20 Claims, 8 Drawing Sheets

N62 (DSOD) pal00305828.dhcp.pal.sap.corp:00

Table Name: EVENT_NOTIFICATION

Schema: DSOD

Columns | Indexes | Further Properties | Runtime Information

| | Name | SQL Data Type | Dim. | Column Store Data Type | Key | Not Null |
|---|---|---|---|---|---|---|
| 1 | ID | INTEGER | | INT | X(1) | X |
| 2 | TITLE | NVARCHAR | 100 | STRING | | X |
| 3 | DESCRIPTION | NCLOB | 21... | ST_MEMORY_LOB | | |
| 4 | ENABLED | TINYINT | 3 | INT | | X |

CENTRALIZED AND DISTRIBUTED NOTIFICATION HANDLING SYSTEM FOR SOFTWARE APPLICATIONS

BACKGROUND

In software applications, e.g., large enterprise software applications, a system may send a notification to users to update information and events. A notification can be, for example, an email notification, a downtime notification, and/or a special event notification. Depending on the type of the notification, the notification may be either general or specific. Notifications in software applications can generally access user interface (UI), backend control, and/or data storage.

SUMMARY

The present disclosure relates to computer-implemented methods, computer-readable media, and computer systems for a notification handling system. One computer-implemented method for creating a notification object for software applications includes selecting an object type for the notification object; customizing a common attribute of the notification object, wherein the common attribute is defined in a common notification object; determining whether the notification object includes additional attributes to be customized; in response to a determination that the notification object includes additional attributes to be customized, customizing a type attribute of the notification object, wherein the type attribute is defined in a type notification object that has the selected object type; and storing the notification object.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, further comprising: determining whether the object type has a subtype; and in response to a determination that the object type has a subtype, customizing a subtype attribute of the notification object, wherein the subtype attribute is defined in a subtype notification object that has the subtype.

A second aspect, combinable with any of the previous aspects, further comprising: in response to a determination that the notification object does not include additional attributes to be customized, storing the notification object.

A third aspect, combinable with any of the previous aspects, wherein the notification object is used to indicate at least one of an email notification, a downtime notification, or a special event notification.

A fourth aspect, combinable with any of the previous aspects, wherein the notification object has the same notification ID as the common notification object.

A fifth aspect, combinable with any of the previous aspects, wherein the notification object is implemented in a layered architecture.

A sixth aspect, combinable with any of the previous aspects, wherein the layered architecture comprises at least one of a model layer, a controller layer, and a User Interface (UI) layer.

The subject matter described in this specification can be implemented in particular implementations so as to realize one or more of the following advantages. First, the notification handling system approach described in this specification can provide a notification handling framework that is efficient, flexible, and expandable. This approach reduces waste of data storage. Second, the described approach can also reduce duplicate implementation in multiple architectural layers and therefore sub-optimally organized code. Third, the described approach can result in a consistent look-and-feel for user interfaces of notifications. Fourth, this approach can help to maintain the programming overhead in a managed way. Other advantages will be apparent to those of ordinary skill in the art.

The details of one or more implementations of the subject matter of this specification are set forth in the accompanying drawings and the description below. Other features, aspects, and advantages of the subject matter will be apparent from the description, the drawings, and/or the claims.

DESCRIPTION OF DRAWINGS

FIG. 8 represents a screenshot of an example table of common attribute definitions of a downtime notification Like reference numbers and designations in the various drawings indicate like elements.

DETAILED DESCRIPTION

The following detailed description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from the scope of the disclosure. Thus, the present disclosure is not intended to be limited to the described and/or illustrated implementations, but is to be accorded the widest scope consistent with the principles and features disclosed herein.

A large enterprise application may need more than one notification to serve different purposes of notifications. The notifications can include, for example, email notifications, downtime notifications, and/or special event notifications. In some cases, some of the notifications can share one or more properties. In some cases, some of the notifications can have different properties. If a notification system generates every notification separately, it may cause duplicate content of data storage and duplicate code implantation in multiple architectural layers. This approach may also create out-of-sync code, out-of-sync code behavior, and/or an inconsistent look-and-feel in different user interface (UI) areas. If properties of the notifications are generated and stored together without categorization, data storage waste, suboptimal organized code, and/or a less flexible and expandable notification system can result.

In some implementations, a combination of centralized and distributed approaches can be used to create a notification framework. The framework can define a common notification object that includes common attributes of one or more notifications. The framework can also define individual notifications for individual notification purposes. The framework can further extend to more categorized notification handling by defining subtype notification objects that belong to one or more type notification objects. In some implementations, each notification object can have a notification ID. In some cases, the common notification object, the type notification objects, and the subtype notification objects can be linked by notification type/subtypes and notification IDs.

In the UI layer of the framework, the input UI of a notification can be the combination of common UI, type/subtypes UI, and/or individual UI types and/or subtypes. In some cases, the type and/or subtypes can be visible. Alternatively or in combination, the type and/or subtypes can be invisible. In some cases, the UI of a notification can be customizable. For example, the common rendering UI can render common information of various notifications, and the individual UI can render an individual notification UI.

Figure 1:
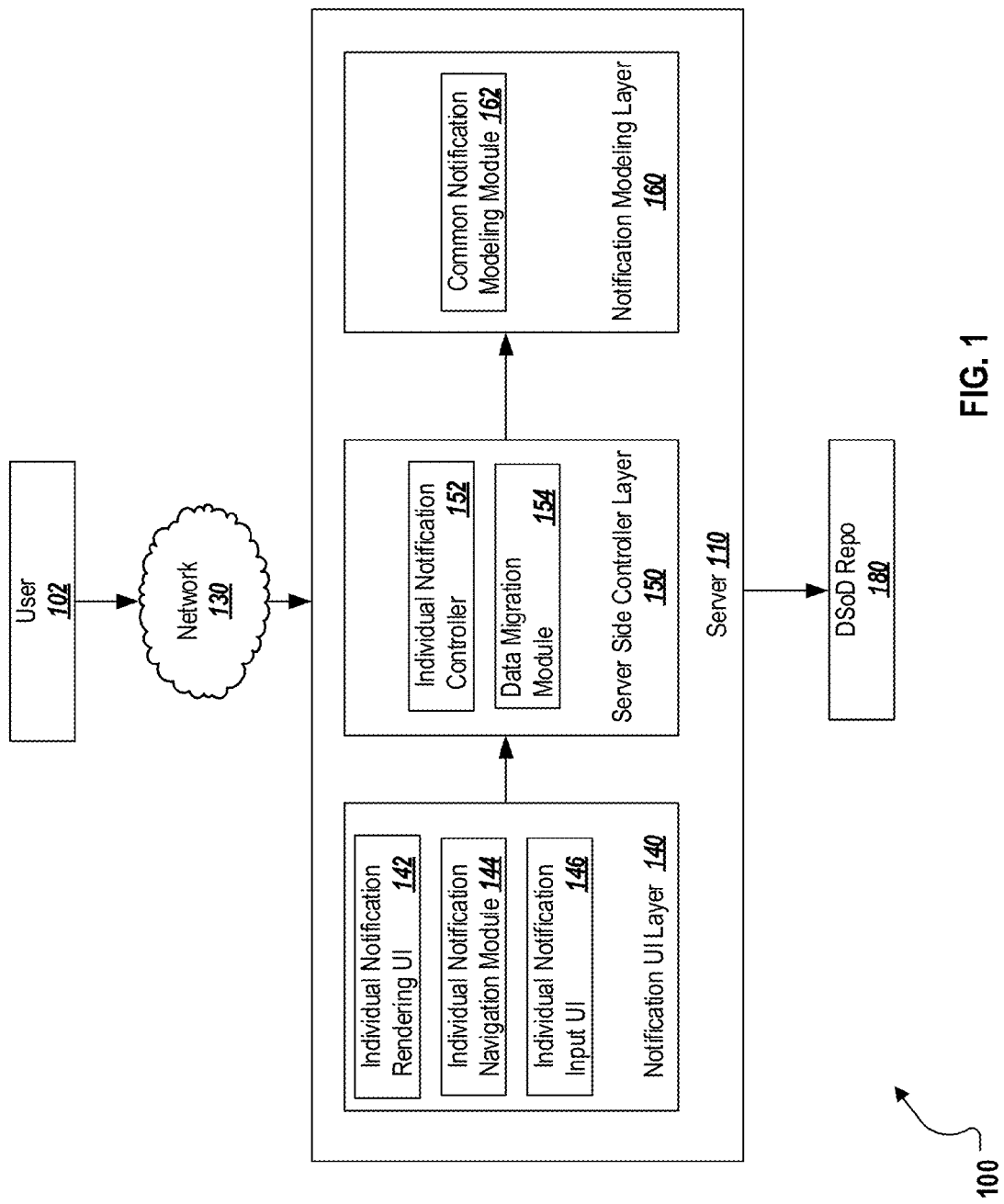
FIG. 1 is a high-level architecture block diagram illustrating a notification handling system according to an implementation.

FIG. 1 is a high-level architecture block diagram illustrating a notification handling system 100 according to an implementation. At a high level, the illustrated system 100 includes a user 102 that is communicably coupled with a server 110 through a network 130. The illustrated system 100 also includes a Data Service on Demand (DSoD) Repository (Repo) 180. The described illustration is only one possible implementation of the described subject matter and is not intended to limit the disclosure to the single described implementation. Those of ordinary skill in the art will appreciate the fact that the described components can be connected, combined, and/or used in alternative ways consistent with this disclosure.

The user 102 represents any person, application, set of applications, software, software modules, hardware, or combination thereof that can use the notification handling system 100 to generate or to receive notifications. In some cases, the user 102 can use a browser and enter the address of the server 110 to access the notification handling system 100.

The server 110 represents any application, set of applications, software, software modules, hardware, or combination of software and hardware that can be used to generate and handle notifications. As illustrated, the server 110 includes a notification UI layer 140, a server side controller layer 150, and a notification modeling layer 160.

The notification UI layer 140 represents software, software modules, hardware, or combination thereof that can be used to provide UIs for notification objects. As illustrated, the notification UI layer 140 includes an individual notification rendering UI 142, an individual notification navigation module 144, and an individual notification input UI 146. The individual notification rendering UI 142 represents an application, software, software modules, hardware, or combination of software and hardware that can be used to render a UI for an individual notification. In some implementations, the user 102 can receive the rendered notification from an administrator who writes the notification information. The individual notification navigation module 144 represents an application, software, software modules, hardware, or combination thereof that can be used to handle navigations for an individual notification. In some implementations, the individual notification navigation module 144 includes instructions to navigate to a page of the individual notification UI. The individual notification input UI 146 represents an application, software, software modules, hardware, or combination of software and hardware that can be used to receive input for an individual notification. In some implementations, the individual notification input UI 146 can include a UI that enables the user 102 to input information for an individual notification. This information can include title, description, and/or other attributes of the individual notification. FIGS. 3-7 and associated descriptions provide additional details of the notification UI layer 140.

The server side controller layer 150 represents software, software modules, hardware, or combination thereof that can be used to handle operations for notification objects. As illustrated, the server side controller layer 150 includes an individual notification controller 152 and a data migration module 154. The individual notification controller 152 represents an application, software, software modules, hardware, or combination thereof that can be used to handle operations for an individual notification. In some implementations, the individual notification controller 152 can receive an individual notification from an administrator, save the individual notification to a database, retrieve data of the individual notification from the database, and/or send notification information to the notification UI layer 140 for notification rendering.

The data migration module 154 represents an application, software, software modules, hardware, or combination thereof that can be used to process data migrations. In some implementations, the data migration module 154 can manipulate database creation and modification in a different system in case of a data migration. For example, when the notification handling system 100 migrates to a different database or a different server, the data migration module 154 can migrate the notification data to the different database or server, instead of manually creating every database from scratch in the new system. FIGS. 3-7 and associated descriptions provide additional details of the server side controller layer 150.

The notification modeling layer 160 represents a software, software modules, hardware, or combination thereof that can be used to model notification objects. In some implementations, the server 110 writes notification data to a database based on notification models. As illustrated, the notification modeling layer 160 includes a common notification modeling module 162. The common notification modeling module 162 represents an application, software, software modules, hardware, or combination thereof that can be used to model a common notification object. In some implementations, the common notification modeling module 162 can define common notification attributes. In some implementations, the notification modeling layer 160 can also include type notification models, subtype notification models, and/or individual notification models. FIGS. 3-7 and associated descriptions provide additional details of the notification modeling layer 160.

The DSoD Repo 180 represents software, software modules, hardware, or combination thereof that can be used to store notification data. In some implementations, the DSoD Repo 180 is a database. The DSoD Repo 180 can be used to save and retrieve the notification objects. In some cases, the DSoD Repo 180 can be located in the server 110. Alternatively or in combination, the DSoD Repo 180 can be located in a database server that is communicably coupled with the server 110.

The network 130 facilitates communications between the components of the system 100 (e.g., between the user 102 and the server 110). In some implementations, the network 130 can be a wireless or a wireline network. In some implementations, the network 130 can also be a memory pipe, a hardware connection, or any internal or external communication paths.

While portions of the software elements illustrated in FIG. 1 are shown as individual modules that implement the various features and functionality through various objects, methods, or other processes, the software can instead include a number of sub-modules, third-party services, components, libraries, and the like, as appropriate. Conversely, the features and functionality of various components can be combined into single components as appropriate.

Figure 2:
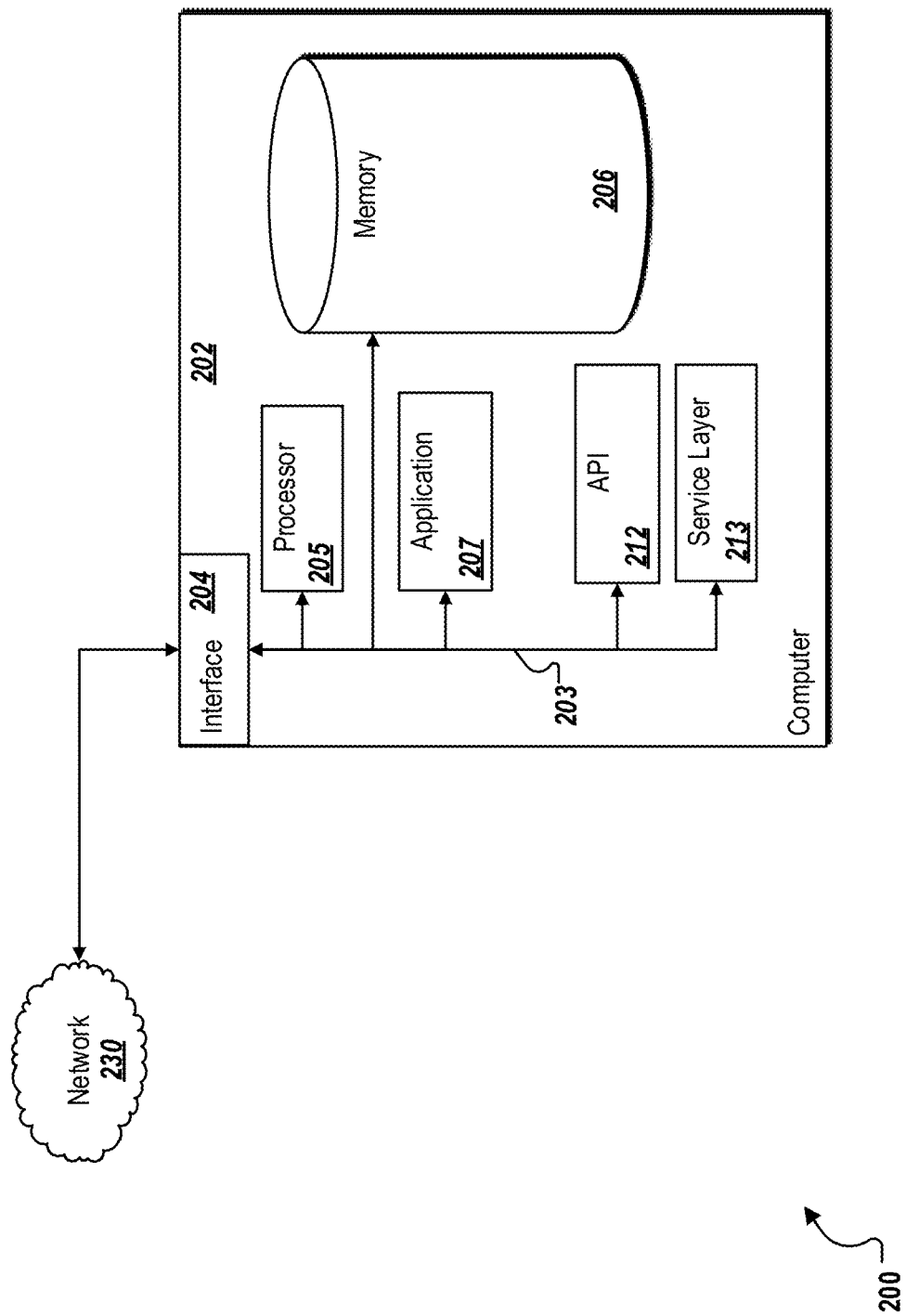
FIG. 2 is a block diagram of an exemplary computer used in a notification handling system according to an implementation.

FIG. 2 is a block diagram 200 of an exemplary computer used in a notification handling system according to an implementation. The illustrated computer 202 is intended to encompass any computing device such as a server, desktop computer, laptop/notebook computer, wireless data port, smart phone, personal data assistant (PDA), tablet computing device, one or more processors within these devices, and/or any other suitable processing device, including both physical and/or virtual instances of the computing device. Additionally, the computer 202 may comprise a computer that includes an input device, such as a keypad, keyboard, touch screen, other device that can accept user information, and/or an output device that conveys information associated with the operation of the computer 202, including digital data, visual and/or audio information, or a GUI.

The computer 202 can serve as a client, network component, a server, a database or other persistency, and/or any other component of the system 100. The illustrated computer 202 is communicably coupled with a network 230. In some implementations, one or more components of the computer 202 may be configured to operate within a cloud-computing-based environment.

At a high level, the computer 202 is an electronic computing device operable to receive, transmit, process, store, or manage data and information associated with the system 100. According to some implementations, the computer 202 may also include or be communicably coupled with an application server, e-mail server, web server, caching server, streaming data server, business intelligence (BI) server, and/or other server.

The computer 202 can receive requests over network 230 from a client application (e.g., executing on another computer 202) and respond to the received requests by processing the said requests in an appropriate software application. In addition, requests may also be sent to the computer 202 from internal users (e.g., from a command console or by another appropriate access method), external or third parties, other automated applications, as well as any other appropriate entities, individuals, systems, or computers.

Each of the components of the computer 202 can communicate using a system bus 203. In some implementations, any and/or all the components of the computer 202, both hardware and/or software, may interface with each other and/or the interface 204 over the system bus 203 using an application programming interface (API) 212 and/or a service layer 213. The API 212 may include specifications for routines, data structures, and object classes. The API 212 may be either computer language-independent or -dependent and refer to a complete interface, a single function, and/or a set of APIs. The service layer 213 provides software services to the computer 202 and/or the system 100. The functionality of the computer 202 may be accessible for all service consumers using this service layer. Software services, such as those provided by the service layer 213, provide reusable, defined business functionalities through a defined interface. For example, the interface may be software written in JAVA, C++, or other suitable language providing data in Extensible Markup Language (XML) format or other suitable format. While illustrated as an integrated component of the computer 202, alternative implementations may illustrate the API 212 and/or the service layer 213 as stand-alone components in relation to other components of the computer 202 and/or system 100. Moreover, any or all parts of the API 212 and/or the service layer 213 may be implemented as child or sub-modules of another software module, enterprise application, or hardware module without departing from the scope of this disclosure.

The computer 202 includes an interface 204. Although illustrated as a single interface 204 in FIG. 2, two or more interfaces 204 may be used according to particular needs, desires, or particular implementations of the computer 202 and/or system 100. The interface 204 is used by the computer 202 for communicating with other systems in a distributed environment—including within the system 100—connected to the network 230 (whether illustrated or not). Generally, the interface 204 comprises logic encoded in software and/or hardware in a suitable combination and operable to communicate with the network 230. More specifically, the interface 204 may comprise software supporting one or more communication protocols associated with communications such that the network 230 or interface's hardware is operable to communicate physical signals within and outside of the illustrated system 100.

The computer 202 includes a processor 205. Although illustrated as a single processor 205 in FIG. 2, two or more processors may be used according to particular needs, desires, or particular implementations of the computer 202 and/or the system 100. Generally, the processor 205 executes instructions and manipulates data to perform the operations of the computer 202. Specifically, the processor 205 executes the functionality required for notification handling.

The computer 202 also includes a memory 206 that holds data for the computer 202 and/or other components of the system 100. Although illustrated as a single memory 206 in FIG. 2, two or more memories may be used according to particular needs, desires, or particular implementations of the computer 202 and/or the system 100. While memory 206 is illustrated as an integral component of the computer 202, in alternative implementations, memory 206 can be external to the computer 202 and/or the system 100.

The application 207 is an algorithmic software engine providing functionality according to particular needs, desires, or particular implementations of the computer 202 and/or the system 100, particularly with respect to functionality required for notification handling. For example, application 207 can serve as one or more components/applications described in FIGS. 1-3. Further, although illustrated as a single application 207, the application 207 may be implemented as multiple applications 207 on the computer 202. In addition, although illustrated as integral to the computer 202, in alternative implementations, the application 207 can be external to the computer 202 and/or the system 100.

There may be any number of computers 202 associated with, or external to, the system 100 and communicating over network 230. Further, the terms "client," "user," and other appropriate terminology may be used interchangeably as appropriate without departing from the scope of this disclosure. Moreover, this disclosure contemplates that many users may use one computer 202, or that one user may use multiple computers 202.

Figure 3:
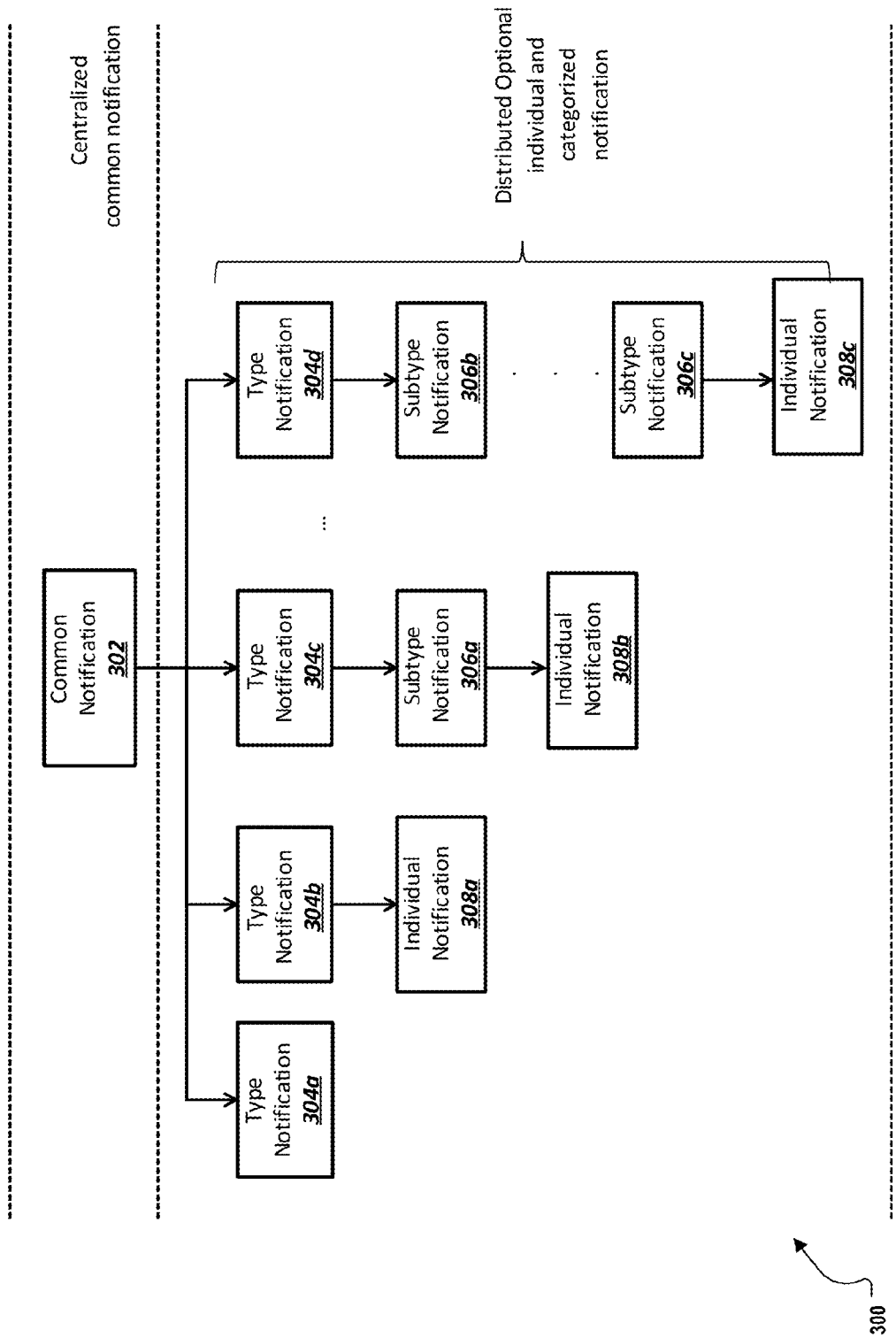
FIG. 3 is a block diagram illustrating a notification framework that includes centralized and distributed notification objects according to an implementation.

FIG. 3 is a schematic diagram illustrating a notification framework 300 that includes centralized and distributed notification objects according to an implementation. For clarity of presentation, the description that follows generally describes the framework 300 in the context of FIGS. 1-2 and 4-7. The illustrated framework 300 includes a common notification object 302, type notification objects 304a-d, subtype notification objects 306a-c, and individual notification objects 308a-c.

As illustrated in FIG. 3, the notification framework 300 can define a common notification object 302. Defining a common notification object may provide a centralized approach to handle attributes that are common to one or more notification objects. For example, the common notification object 302 can include common attributes for multiple notification objects. In some cases, the common notification object 302 can include common attributes for all the notifications in the system.

As illustrated in FIG. 3, the notification framework 300 can define type notification objects 304a-d. In some implementations, the notification framework 300 can categorize notifications into one or more notification types according to the purpose of the notifications. For example, the notification types can include step notifications, tracker notifications, workflow notifications, and milestone notifications. The step notification can notify events related to steps of workflows. For example, the step notification can notify that a step is overdue, a new step is assigned, or a step deadline is approaching. The tracker notifications can notify events related to workflow tracking, e.g., notifying that a participant is assigned as a tracker of the workflow or notifying a tracker that a workflow step has not been completed. The workflow notifications can notify events related to workflow, e.g., notifying that a workflow exception has occurred, indicating that a workflow is overdue or completed, or notifying that a workflow deadline is approaching. The milestone notification can notify events related to milestones, e.g., notifying that a milestone has been reached to a workflow originator or an assigned tracker.

In the illustrated example, each of the type notification objects 304a-d represent a notification object of a different notification type. In some implementations, a type notification object can include the common attributes of the common notification object 302. Each of the type notification objects 304a-d can also include additional attributes that are common to its notification type.

In some implementations, as illustrated in FIG. 3, the notification framework 300 can also define subtype notification objects 306a-c. The notification framework 300 can further categorize notifications in each notification type into one or more notification subtypes according to the purpose of the notifications. For example, the step notification type can include a subtype to notify that a step is overdue, a subtype to notify that a new step is assigned, and a subtype to notify that a step deadline is approaching. The tracker notifications type can include a subtype to notify that a participant is assigned as a tracker of the workflow and a subtype to notify a tracker that a workflow step has not been completed. The workflow notifications type can include a subtype to notify that a workflow exception has occurred, a subtype to notify that a workflow is overdue or completed, and a subtype to notify that a workflow deadline is approaching. The milestone notification type can include a subtype to notify that a milestone has been reached to a workflow originator and can include a subtype to notify that a milestone has been reached to an assigned tracker.

In the illustrated example, each of the subtype notification objects 306a-c can represent a notification object of a different notification subtype. Each notification type may have zero, one, or more subtypes and, therefore, each type notification object may have zero, one, or more subtype notification objects that are children of the type notification object. In the illustrated example, the type notification objects 304a-b have no child subtype notification object. The type notification object 304c has one child subtype notification object, i.e., the subtype notification object 306a. The type notification object 304d has more than one child subtype notification object, e.g., the subtype notification object 306b-c. In some implementations, a subtype notification object can include the attributes of its parent type notification object. A subtype notification object can also include additional attributes that are common to its notification subtype.

In some implementations, as illustrated in FIG. 3, the notification framework 300 can also define individual notification objects 308a-c. A type or subtype notification object can have zero, one, or more child individual objects. In some implementations, an individual notification object can include the attributes of its parent type or subtype notification object. An individual notification object can also include additional attributes that are specific to its notification. In the illustrated example, the type notification object 304a has no child individual notification object. The type notification object 304a has one child individual notification object type 308a. The subtype notification objects 306b-c have one child individual notification object type 308b-c, respectively. Categorizing different notification types and subtypes and defining type, subtype, and individual notification objects provide a distributed approach to handle notifications.

Figure 4:
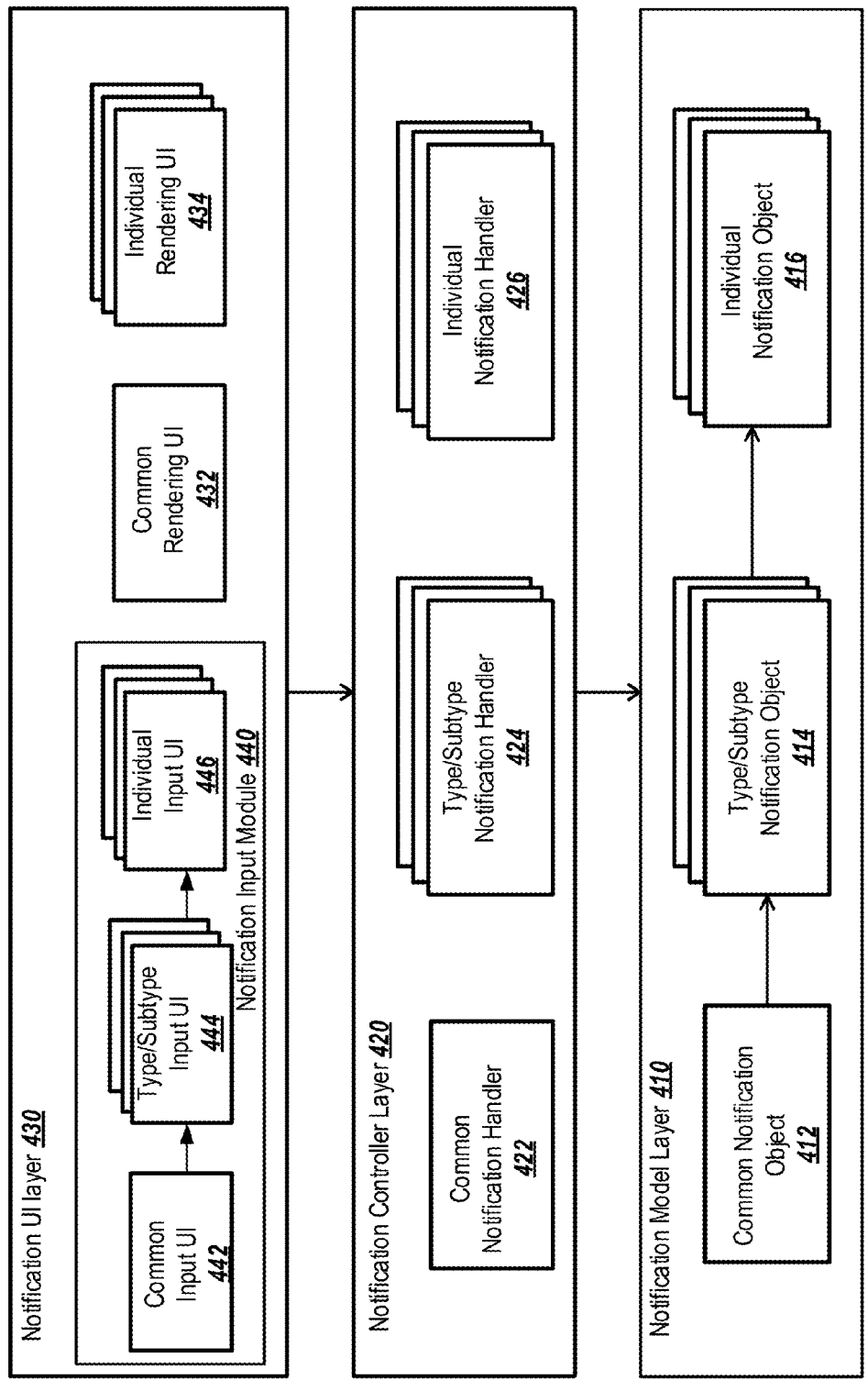
FIG. 4 is a block diagram illustrating a notification framework with multiple layers according to an implementation.

FIG. 4 is a block diagram illustrating a notification framework 400 with multiple layers according to an implementation. For clarity of presentation, the description that follows generally describes the notification framework 400 in the context of FIGS. 1-3 and 5-7. The notification framework 400 includes a notification model layer 410, a notification controller layer 420, and a notification UI layer 430.

The notification model layer 410 represents software, software modules, hardware, or combination thereof that can be used to model notification objects. In some implementations, the notification model layer 410 can use SAP HANA STUDIO (or an application(s) providing equivalent functionality) for common notification table, type/subtype notification table, and/or individual notification table definitions. As illustrated, the notification model layer 410 can define a common notification object 412, one or more type/subtype notification objects 414, and one or more individual notification objects 416. The common notification object 412 can include attributes common to multiple or, in some implementations, to all notifications. The type/subtype notification objects 414 can include attributes common to type/subtype notifications. The individual notification objects 416 can include attributes specific to individual notifications.

The notification UI layer 430 represents software, software modules, hardware, or combination of software and hardware that can be used to provide UIs for notification objects. In some implementations, the notification UI layer 430 can use SAP UI5 with JavaScript, JSON, and/or XML as the UI layer technology. As illustrated, the notification UI layer 430 can include a notification input module 440, a common rendering UI 432, and one or more individual rendering UI 434. In the illustrated example, the notification input module 440 can define a common input UI 442, one or more type/subtype input UI 444, and one or more individual input UI 446. The common input UI 442 can define input mechanisms, e.g., views to edit notification information, which are common to multiple or, in some implementations, to all notifications. The type/subtype input UI 444 can define input mechanisms that are common to type/subtype notifications. The individual input UI 446 can define input mechanisms that are specific to individual notifications. The common rendering UI 432 can render a UI that is common to multiple or, in some implementations, to all notifications. The individual rendering UI 434 can render UIs that are specific to individual notifications.

The notification controller layer 420 represents software, software modules, hardware, or combination thereof that can be used to execute functions for notification objects. In some implementations, the notification controller layer 420 can serve as the bridge between the notification UI layer 430 and the notification model layer 410. For example, the notification UI layer 430 can delegate some UI functions to the notification controller layer 420. The notification controller layer 420 can operate the notification model layer 410 to execute the UI functions. In some implementations, the notification controller layer 420 can use JAVA SERVLETs for server-side controllers to implement concrete controller handling methods and can use JAVA and XML for other classes and files. In some implementations, the notification UI layer 430 and the notification controller layer 420 can communicate with AJAX and JSON data format. As illustrated, the notification controller layer 420 can define a common notification handler 422, one or more type/subtype notification handlers 424, and one or more individual notification handlers 426. The common notification handler 422 can execute functions common to multiple or, in some implementations, to all notifications. The type/subtype notification handler 424 can execute functions common to the type/subtype notification. The individual notification handler 426 can execute functions specific to the individual notification.

In some implementations, the notification type can be selected in an edit screen of notification to show individual notification information. If the notification framework 400 defines type or subtype notification, the type and subtype of notification can be selected in the edit screen and the type/subtype of individual notification view can be displayed. This process can be repeated until there are no further subtypes. Notifications can be created, edited, saved, and deleted according to an individual application's requirements. Notification input can also be customized according to an individual application's requirements. The notification framework 400 can also have different notification rendering according to an individual application's requirements. As described above, the rendering view can be categorized into common notification rendering UI and individual notification rendering UI to show the notification to end users. The notification framework 400 can be implemented in Java, C/C++, or any other languages. The notification framework 400 can be interact with relational, object-oriented, or any other database technology. The notification framework 400 can also be implemented in any business applications.

In some implementations, the notification framework 400 can provide end-to-end support in creating and handling notifications. For example, the notification framework 400 can capture notification information from a site administration page, render the notification information in a tenant page, save the notification information, and retrieve the notification information.

Figure 5:
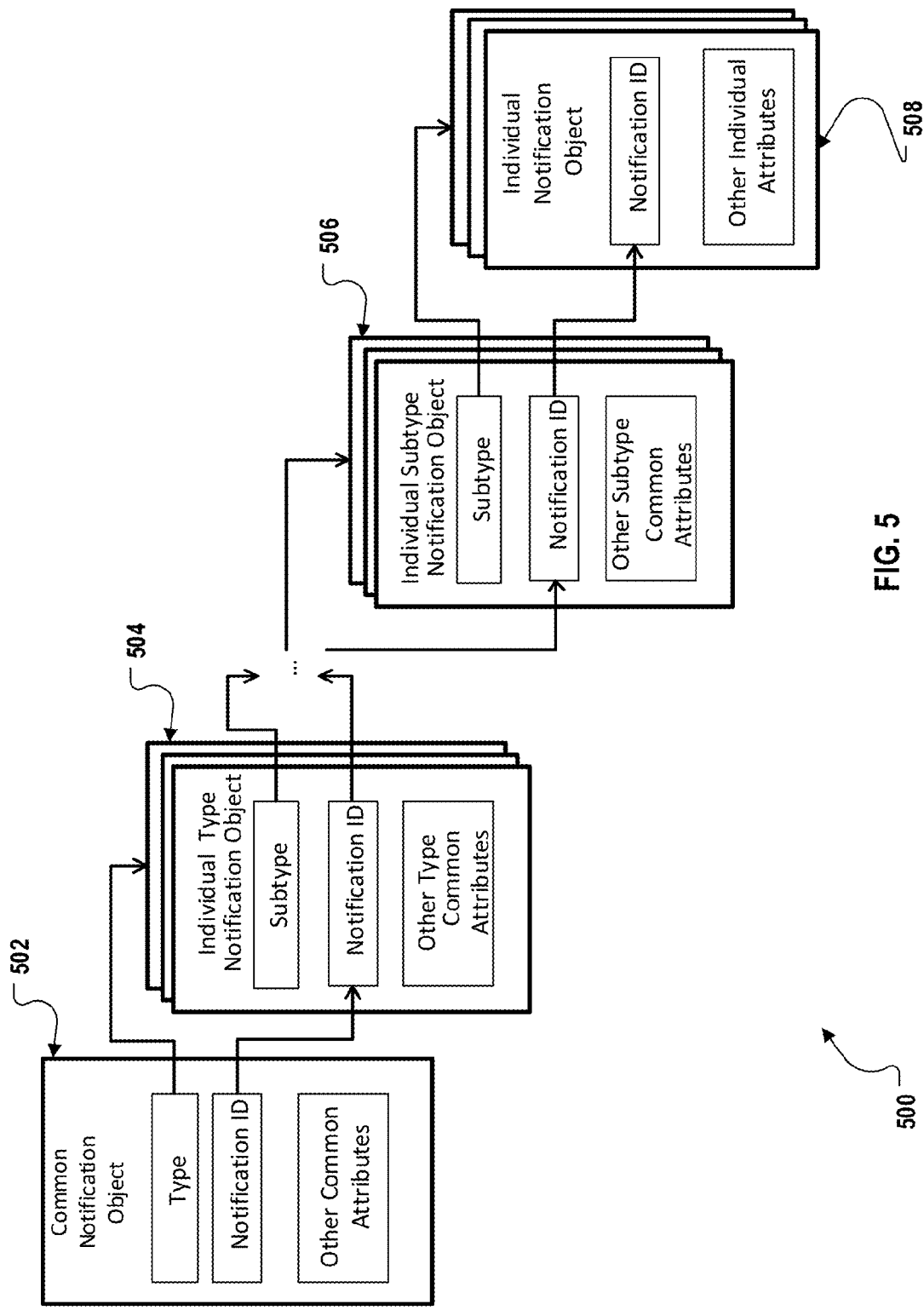
FIG. 5 is a block diagram illustrating a notification framework that categorizes notification objects according to an implementation.

FIG. 5 is a block diagram illustrating a notification framework 500 that categorizes notification objects according to an implementation. As illustrated, the notification framework 500 includes a common notification object 502, one or more individual type notification objects 504, one or more individual subtype notification objects 506, and one or more individual notification objects 508.

In the illustrated example, the common notification object 502 includes a type field, a notification ID, and other common attributes. The type field can indicate that the type of the common notification object 502 is considered to be "common." The notification ID can be an ID that represents the common notification object 502.

The notification framework 500 is extendable for categorized notifications. For example, the notification framework 500 includes one or more individual type notification objects 504. Each individual type notification object 504 can include other attributes that are common to its type. Each individual type notification object 504 can include a subtype field that indicates the type of the individual type notification object 504. Each individual type notification object 504 can also include a notification ID. In some implementations, the notification ID of the individual type notification object 504 is the same as the notification ID of the common notification object 502.

In some implementations, the notification objects can be further categorized into subtypes for each type notification object. This process can be repeated until there is no subtype of notification objects needed to be defined. For example, the notification framework 500 includes one or more individual subtype notification objects 506. Each individual subtype notification object 506 can include a subtype field that indicates the subtype of the individual subtype notification object 506. Each individual subtype notification object 506 can include other attributes that are common to its subtype. Each individual subtype notification object 506 can also include a notification ID. In some implementations, the notification ID of the individual subtype notification object 506 is the same as the notification ID of its parent type notification object 504. Therefore, the notification objects can be linked by the notification ID.

As illustrated, the notification framework 500 includes one or more individual notification objects 508. Each individual notification object 508 can include other attributes that are specific to its subtype. In some implementations, the individual notification object 508 does not have a type or a subtype field because the individual notification object 508 does not have a type or a subtype. Each individual subtype notification object 506 can also include a notification ID. In some implementations, the notification ID of the individual subtype notification object 506 is the same as the notification ID of its parent subtype or type notification object. Therefore, the notification objects can be linked by the notification ID.

Figure 6:
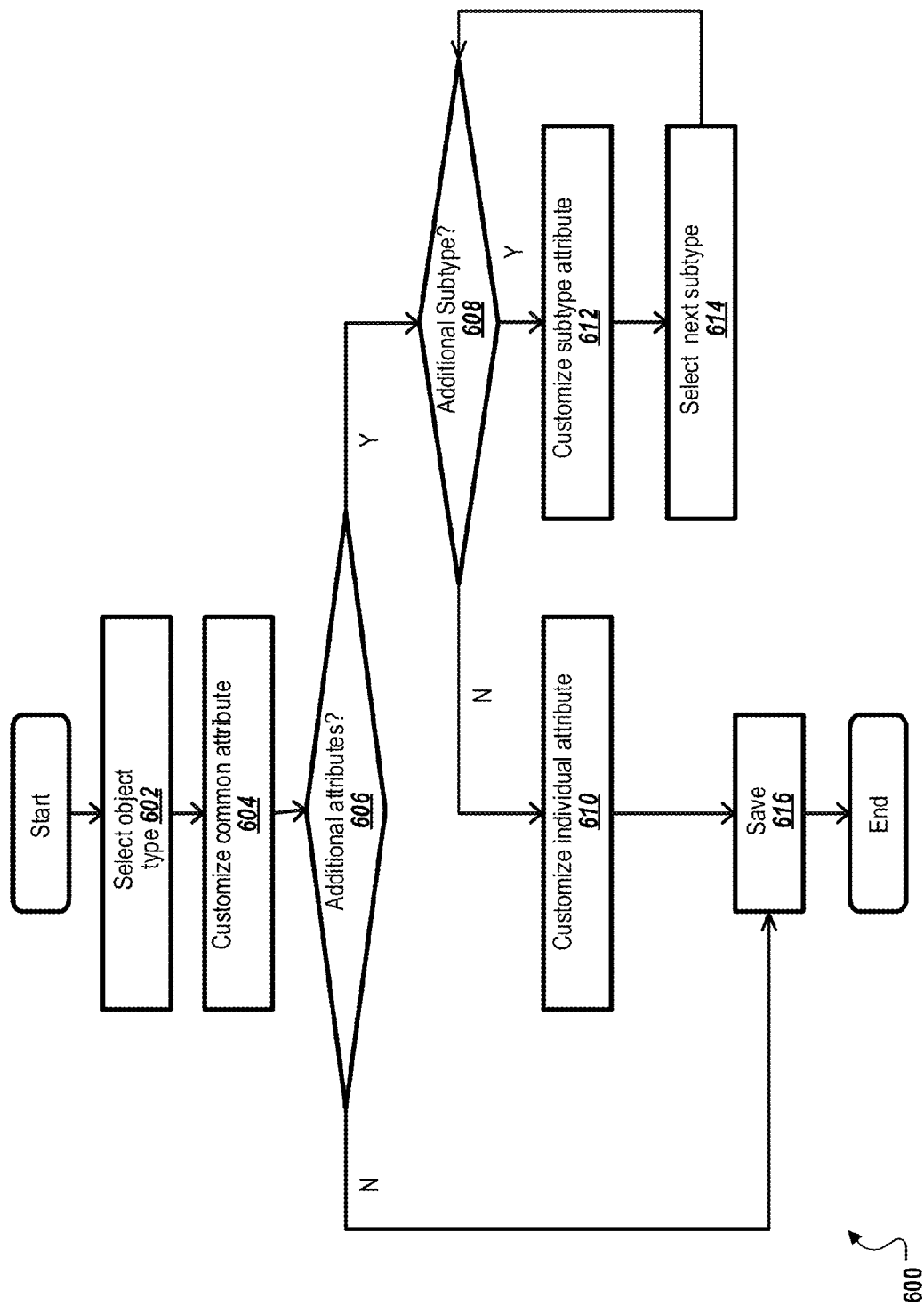
FIG. 6 is a flow diagram of a method illustrating a notification creation process according to an implementation.

FIG. 6 is a flow diagram of a method 600 illustrating a notification creation process according to an implementation. For clarity of presentation, the description that follows generally describes method 600 in the context of FIGS. 1-5 and 7. However, it will be understood that method 600 may be performed, for example, by any other suitable system, environment, software, and hardware, or a combination of systems, environments, software, and hardware as appropriate. In some implementations, various steps of method 600 can be run in parallel, in combination, in loops, and/or in any order.

At 602, an object type for the notification object can be selected. In some cases, the object type can be selected by a system administrator who creates the notification object. From 602, method 600 proceeds to 604. At 604, a common attribute of the notification object can be customized. The common attribute can be defined in a common notification object. For example, the common attribute can include a common UI. In some cases, the common attribute can have a default value. In some cases, an attribute can be customized into a value that is different than the default value. For example, a common attribute can include a color code for a notification dialog box, and the default value of the common attribute can be black. The default value can be changed to a different color, e.g., red, during the customization step. In another example, the default value of the common attribute can be a visible notification, which can be changed to invisible. Alternatively or in combination, the attribute can be customized by using the default value.

From 604, method 600 proceeds to 606, where a determination can be made on whether the notification object includes additional attributes other than the common attributes. If there are no additional attributes to include, method 600 proceeds from 606 to 616. If there are additional attributes, method 600 proceeds from 606 to 608. At 608, the type attributes can be customized and included in the notification object. The type attribute can be defined in a type notification object that has the same type as the object type selected at 602.

In some implementations, whether the object type has additional subtypes is determined at 608. If the object type has an additional subtype, method 600 proceeds from 608 to 612. At 612, the subtype attributes can be customized and included in the notification object. The subtype attribute can be defined in a subtype notification object. The subtype notification object can be a subtype of the type notification object. From 612, method 600 proceeds to 614, where the next subtype can be selected. From 614, method 600 proceeds to 608. Step 608, 612, and 614 can be repeated until the object type has no additional subtypes. If the object has no additional subtypes, method 600 proceeds from 608 to 610. At 610, individual attributes can be customized and included in the notification object. From 610, method 600 proceeds to 616, where the notification object is saved in the notification framework.

Figure 7:
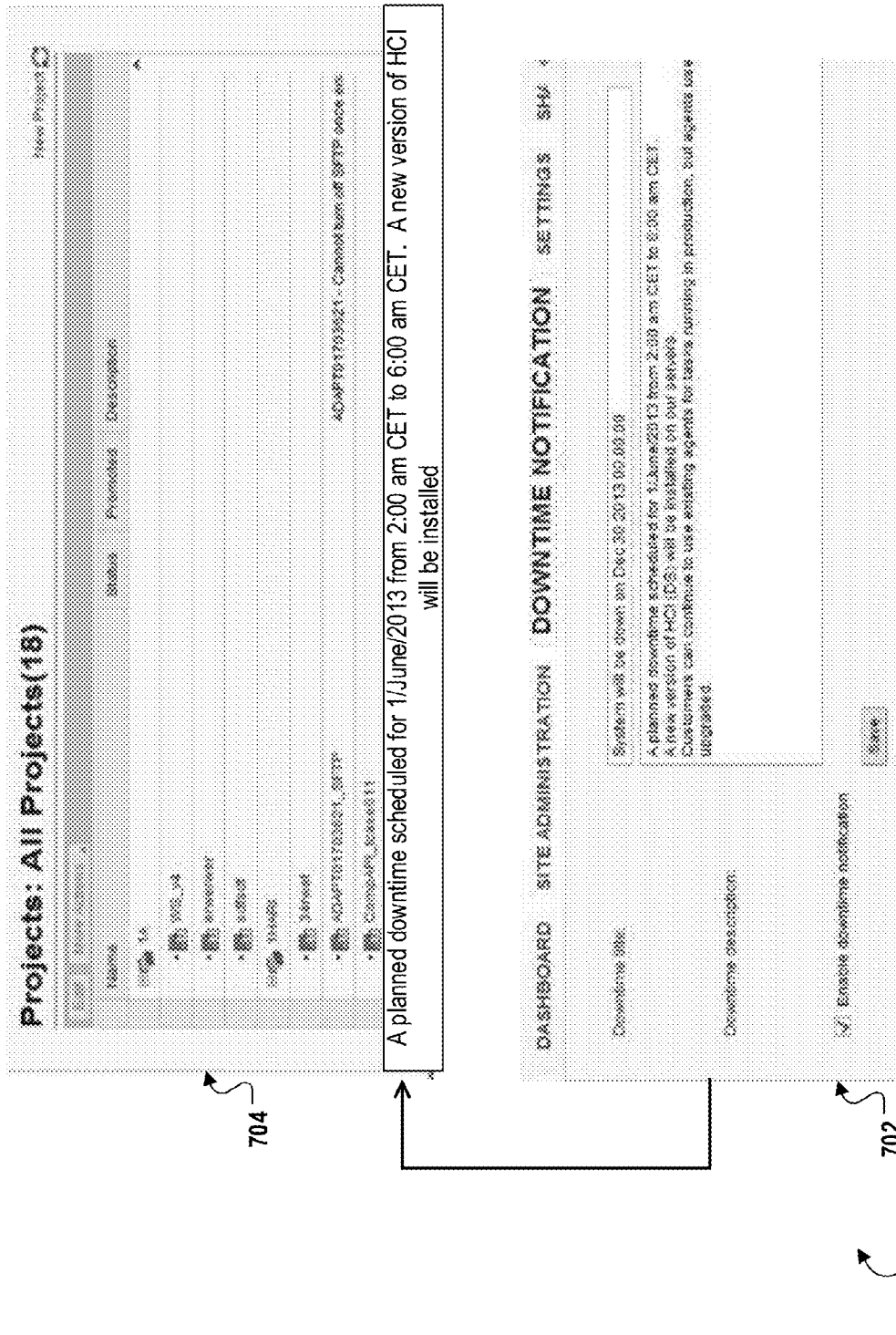
FIG. 7 is a block diagram 700 illustrating an example notification according to an implementation.

FIG. 7 is a block diagram 700 illustrating an example notification according to an implementation. For clarity of presentation, the description that follows generally describes diagram 700 in the context of FIGS. 1-6. The diagram 700 includes a creation graphical user interface (GUI) 702 and a rendered GUI 704. As illustrated, the creation GUI 702 shows the creation and edition of a downtime notification. In some cases, the creation GUI 702 can be located in the site administration page. The creation GUI 702 can collect the notification information. The creation GUI 702 can also provide a save button that saves the notification to a database when the save button is pressed. The rendered GUI 704 shows the rendered notification that is created in the creation GUI 702. In some cases, the rendered GUI 704 can be rendered in a tenant login page that binds with the shell. As illustrated, the rendered notification displays a downtime message.

The downtime notification can be a feature for Data Service on Demand. The downtime notification can enable a customer to see in advance when the downtimes or system upgrades are planned, so that the customer can act in advance. In order to fulfill the downtime notification requirement, the system can support a downtime notification end-to-end scenario. For example, the system can capture the downtime notification information from site admin page, render downtime notification information in tenant page, save the downtime notification, and retrieve downtime notification information. In some implementations, the system can also support data migration.

In some implementations, the downtime notification can be created by using a common notification model event notification. Referring to FIG. 8, FIG. 8 represents a screenshot of an example table of common attribute definitions of a downtime notification.

In the example illustrated in FIG. 8, the common attributes are sufficient for the downtime notification object. In some cases, the downtime notification object can be extended to include additional attributes. In some implementations, the downtime notification model can be generated with a MYBATIS (or other) model generator. The following list represents an example of the model classes and files for the downtime notification model:
EventNotificaiton.java
EventNotificaitonExample.java
EventNotifcaitonMapper.java
EventNotficationMapper.xml In some implementations, data migration can be supported for downtime notification. The following migration file represents an example for downtime notification migration:
V1_0_5_010_AddEventNotification.java
SITE_V1_0_5_010_AddEventNotification.sql In an example, the input UI of the downtime notification can be defined in the downtime_notificaiton_view.js. The rendering UI of the downtime notification is a new UI5 component notification bar that can be set in the shell_init.js file. The downtime notification controller can be DowntimeNotificationController.java.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media, and memory devices, including by way of example, semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user, and a keyboard and a pointing device, e.g., a mouse, trackball, or trackpad, by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language-independent or -dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in Extensible Markup Language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products. Furthermore, while the operations depicted in the drawings may indicate start and/or end points for the operations, implementations of the methods described in the disclosure are not restricted to the particular start and/or end point as illustrated. Other implementations may start and/or end at different points of the operations.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A method for creating a notification object for software applications:
    selecting an object type for the notification object;
    customizing a common attribute of the notification object, wherein the common attribute is defined in a common notification object;
    determining whether the notification object includes additional attributes to be customized;
    in response to a determination that the notification object includes additional attributes to be customized, customizing a type attribute of the notification object, wherein the type attribute is defined in a type notification object that has the selected object type; and
    storing the notification object.

2. The method of claim 1, further comprising:
    determining whether the object type has a subtype; and
    in response to a determination that the object type has a subtype, customizing a subtype attribute of the notification object, wherein the subtype attribute is defined in a subtype notification object that has the subtype.

3. The method of claim 1, further comprising:
    in response to a determination that the notification object does not include additional attributes to be customized, storing the notification object.

4. The method of claim 1, wherein the notification object is used to indicate at least one of an email notification, a downtime notification, or a special event notification.

5. The method of claim 1, wherein the notification object has the same notification ID as the common notification object.

6. The method of claim 1, wherein the notification object is implemented in a layered architecture.

7. The method of claim 6, wherein the layered architecture comprises at least one of a model layer, a controller layer, and a User Interface (UI) layer.

8. A system for creating a notification object for software applications, comprising:
    a memory; and
    at least one hardware processor interoperably coupled with the memory and configured to:
        select an object type for the notification object;
        customize a common attribute of the notification object, wherein the common attribute is defined in a common notification object;
        determine whether the notification object includes additional attributes to be customized;
        in response to a determination that the notification object includes additional attributes to be customized, customize a type attribute of the notification object, wherein the type attribute is defined in a type notification object that has the selected object type; and
        store the notification object.

9. The system of claim 8, wherein the at least one hardware processor is further configured to:
    determine whether the object type has a subtype; and
    in response to a determination that the object type has a subtype, customize a subtype attribute of the notification object, wherein the subtype attribute is defined in a subtype notification object that has the subtype.

10. The system of claim 8, wherein the at least one hardware processor is further configured to:
  in response to a determination that the notification object does not include additional attributes to be customized, store the notification object.

11. The system of claim 8, wherein the notification object is used to indicate at least one of an email notification, a downtime notification, or a special event notification.

12. The system of claim 8, wherein the notification object has the same notification ID as the common notification object.

13. The system of claim 8, wherein the notification object is implemented in a layered architecture.

14. The system of claim 13, wherein the layered architecture comprises at least one of a model layer, a controller layer, and a User Interface (UI) layer.

15. A non-transitory, computer-readable medium storing computer-readable instructions for creating a notification object for software applications, the instructions executable by a computer and configured to:
  select an object type for the notification object;
  customize a common attribute of the notification object, wherein the common attribute is defined in a common notification object;
  determine whether the notification object includes additional attributes to be customized;
  in response to a determination that the notification object includes additional attributes to be customized, customize a type attribute of the notification object, wherein the type attribute is defined in a type notification object that has the selected object type; and
  store the notification object.

16. The non-transitory, computer-readable medium of claim 15, wherein the instructions are further configured to:
  determine whether the object type has a subtype; and
  in response to a determination that the object type has a subtype, customize a subtype attribute of the notification object, wherein the subtype attribute is defined in a subtype notification object that has the subtype.

17. The non-transitory, computer-readable medium of claim 15, wherein the instructions are further configured to:
  in response to a determination that the notification object does not include additional attributes to be customized, store the notification object.

18. The non-transitory, computer-readable medium of claim 15, wherein the notification object is used to indicate at least one of an email notification, a downtime notification, or a special event notification.

19. The non-transitory, computer-readable medium of claim 15, wherein the notification object has the same notification ID as the common notification object.

20. The non-transitory, computer-readable medium of claim 15, wherein the notification object is implemented in a layered architecture.

\* \* \* \* \*